(12) United States Patent  
Amiga

(10) Patent No.: US 9,313,227 B2  
(45) Date of Patent: Apr. 12, 2016

(54) GATEWAY-BASED AUDIT LOG AND METHOD FOR PREVENTION OF DATA LEAKAGE

(71) Applicant: FIREGLASS LTD., Tel Aviv (IL)

(72) Inventor: Dan Amiga, Herzliya (IL)

(73) Assignee: Amigon Technologies Ltd., Herzlia (IL)

( * ) Notice: Subject to any disclaimer, the term of this patent is extended or adjusted under 35 U.S.C. 154(b) by 34 days.

(21) Appl. No.: 14/488,443

(22) Filed: Sep. 17, 2014

(65) Prior Publication Data

US 2015/0082460 A1 Mar. 19, 2015

Related U.S. Application Data

(60) Provisional application No. 61/878,775, filed on Sep. 17, 2013, provisional application No. 61/878,781, filed on Sep. 17, 2013.

(51) Int. Cl.

| | |
|---|---|
| *H04L 29/06* | (2006.01) |
| *G06F 21/55* | (2013.01) |
| *G06F 21/62* | (2013.01) |
| *G06F 21/85* | (2013.01) |

(52) U.S. Cl.  
CPC .............. *H04L 63/18* (2013.01); *G06F 21/554* (2013.01); *G06F 21/6218* (2013.01); *G06F 21/85* (2013.01); *H04L 63/0838* (2013.01); *H04L 63/10* (2013.01); *H04L 63/145* (2013.01); *G06F 2221/2115* (2013.01); *G06F 2221/2133* (2013.01); *G06F 2221/2139* (2013.01)

(58) Field of Classification Search  
CPC ..................................................... H04L 63/145  
USPC ............................................................. 726/1  
See application file for complete search history.

(56) References Cited

U.S. PATENT DOCUMENTS

| | | | | |
|---|---|---|---|---|
| 2003/0014762 | A1* | 1/2003 | Conover ................. | H04N 7/173 725/110 |
| 2012/0174218 | A1* | 7/2012 | McCoy et al. ...... | H04L 63/0281 726/22 |

* cited by examiner

*Primary Examiner* — Longbit Chai  
(74) *Attorney, Agent, or Firm* — Pearl Cohen Zedek Latzer Baratz LLP

(57) ABSTRACT

A system and method for prevention of data leakage, the system comprising: a server configured to receive and transmit user activity commands; a protection module configured to validate and reconstruct commands received from the server and to transmit the validated reconstructed commands, the protection module further configured to create a security image associated with a specific user; and a secured transmission module configured to transmit the security image to the server while ensuring that the security image is sent securely to the associated user, wherein the server is further configured to receive the security image via the secured transmission module and to present the security image to the associated user.

26 Claims, 6 Drawing Sheets

GATEWAY-BASED AUDIT LOG AND METHOD FOR PREVENTION OF DATA LEAKAGE

CROSS REFERENCE TO RELATED APPLICATIONS

This application claims the benefit of U.S. Provisional Patent Application No. 61/878,775, filed Sep. 17, 2013, and of U.S. Provisional Patent Application No. 61/878,781, filed Sep. 17, 2013, each of which is hereby incorporated by reference in its entirety.

BACKGROUND OF THE INVENTION

There are some known methods used today for establishing remote connection between hosts over an IP network. For example, a remote desktop connection, wherein a user may establish a remote session to the server based on a TCP (Client-Server) connection as the transport layer. The known remote connection solutions are usually based on a full state direct TCP connection from the client connecting from the secured network to the server in the unsecured environment.

When exchanging data between a secured computer network to a less secured computer network, attackers may attempt to infiltrate records, eavesdrop and spy after network communications within the less secured network, perform "man in the middle" attacks or try to exploit vulnerabilities on the secured network side in order to infect it with malware. Machine to machine communication usually relies on a protocol stack as described in the 7 layer OSI model. Different implementations of this model and these protocols have traditionally, over and over again, been exposed to vulnerabilities and attacks in all levels of the OSI layers (e.g., Ethernet, IP TCP, HTTP, and Application Layer). Over the years, different products have been developed to protect against these attacks. The common security paradigm is to segment the network into different perimeters and places security controls on the borders of these perimeters, securing the traffic going in and out between the secured perimeter and the outside world. Traditionally, Firewalls are placed to protect the network layers of the communication model and application Firewalls, Intrusion Prevention Systems (IPS), Proxies and Secure Application Gateways to protect the upper application layers. These solutions' operation model is to inspect the traffic going through them and in the case that something malicious is detected then to break and terminate the connection and thus preventing the attack. This approach was effective when trying to protect against known attacks that are sent in clear form. However, as the attackers got more sophisticated and use unknown 0-Day attacks or use encryption and obfuscation methods to hide their malicious intent, many of these attacks pass undetected by the traditional gateway defenses. As there was no trivial solution to this problem, many corporations and highly classified organizations prefer to work offline, e.g., with no Internet connectivity at all and/or no connectivity to less secured networks. Other options for an organization with classified data are the creation of a dedicated separate network or the creation of a dedicated terminal servers farm with high costs (networking, desktops, IT personnel and etc.) or white-list website access (not practical, still subject to most attacks).

SUMMARY OF THE INVENTION

Some embodiments of the present invention may provide a system and method for prevention of data leakage, the system may include a server configured to receive and transmit user activity commands; a protection module configured to validate and reconstruct commands received from the server and to transmit the validated reconstructed commands, the protection module further configured to create a security image associated with a specific user; and a secured transmission module configured to transmit the security image to the server while ensuring that the security image is sent securely to the associated user, wherein the server is further configured to receive the security image via the secured transmission module and to present the security image to the associated user.

In some embodiments of the present invention, the security image includes a CAPTCHA challenge that has to be solved by the associated user in order to receive further data via the secured transmission module.

In some embodiments of the present invention, the protection module includes a database to store outgoing commands and wherein the security image includes a security log in a visual format listing the outgoing commands entered by the associated user.

In some embodiments of the present invention, the activity commands includes at least one of a list including text entered to a text box, web-page requests and/or any other suitable request.

In some embodiments of the present invention, the activity commands are received via a browser user interface.

In some embodiments of the present invention, the protection module is configured to validate commands based on a pre-determined policy of user behavior.

In some embodiments of the present invention, a CAPTCHA challenge is generated and included in the created security image in case the pre-determined policy is violated by the user, the CAPTCHA challenge has to be solved by the associated user in order to receive further data via the secured transmission module.

In some embodiments of the present invention, the secured transmission module includes a one-way by-pass transmission module for sending the security image created by the protection module to the server separately from data received from another machine.

In some embodiments of the present invention, the protection module is configured to create the security image every given period of time, periodically and/or upon sending a request and/or before transmission of data from another machine via the secured transmission module.

In some embodiments of the present invention, the secured transmission module includes a video output and input components, and wherein the video output component is configured to receive the security image by one-way transmission and send the security image to the video input component by an analog port, and wherein the video input component is configured to regenerate the security image and send the regenerated security image to the server.

In some embodiments of the present invention, the server is configured to receive data via the secured transmission module, display the data as an interactive page enabling a user to operate the interactive page and send data of the operated pages as activity commands via the protection module.

In some embodiments of the present invention, the server is configured to store a data exchange log of audit images of received and/or sent data and/or create a video of the browsing experience made of the audit images.

In some embodiments of the present invention, the security image further includes at least one of the audit images or a video made of the audit images.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
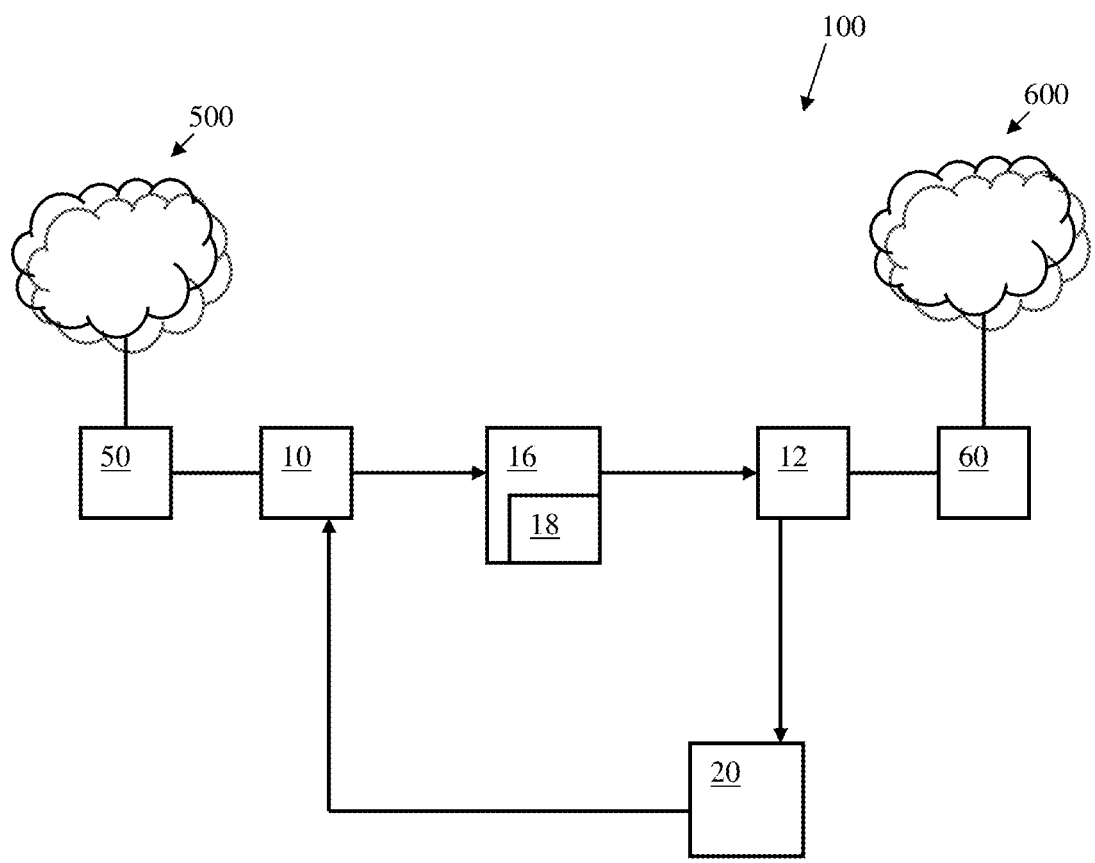
FIG. 1 is a schematic illustration of a system for secured data exchange between computer networks with different security classifications, according to embodiments of the present invention.

It will be appreciated that, for simplicity and clarity of illustration, elements shown in the figures have not necessarily been drawn to scale. For example, the dimensions of some of the elements may be exaggerated, for clarity purposes, relative to other elements. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Some embodiments of the present invention may enable transfer of only images/screenshots/pictures from an unclassified to a classified network, while simulating a real connection as appose to a full state direct connection (TCP/HTTP). It is understood that, by transferring only images, the attack surface is dramatically reduced. In a higher level concept, data is not brought and processed inside the corporate network but only as a generated view of the external non-secured network. All data coming in the non-secured side (for example, but not limited to: JavaScript, HTML, XML, Java applets, Flash code, CSS, Images) is completely transformed and reconstructed as an image.

Some embodiments of the present invention may provide a system and method implementing a solution for secured web browsing and data exchange between computer networks with different security classifications such as, for example, transfer of data between a highly classified network to a less classified network, such as, for example, in web browsing, email exchange, file sharing, metadata synchronization such as, for example, identity, calendar and/or contact synchronization, mobile to corporate network synchronization, documents editing (such as Word®, Excel® documents, etc.). According to some embodiments of the present invention, a robust security solution may be provided, which ensures a definite isolation between two environments and is designated to prevent network, application and/or any other type of attack and/or infiltration, for example coming from the less classified network, as well as any malicious content such as exploits, malwares, trojans, viruses, and any form of Advanced Persistent Treat (APT) attacks and/or intentional and/or unintentional data leakage from the classified to the less-classified network and/or vice versa. Some embodiments of the present invention may enable a secured and reliable Internet access by an authorized user (for example, an employee) from within a corporate environment/network with sensitive or classified data (e.g., by a desktop computer) in a simple and intuitive fashion. The isolation provided by the invention also capable to distinguish between authorized communication initiated by a the user or a trusted entity and between unauthorized traffic in the form of malware Command and Control (C&C) communication and/or other covert channels that can be used for data exfiltration.

Some embodiments of the present invention may provide a simple and elegant solution with low Total Cost of Ownership (TCO), to prevent outside attacks of the secured environment and data/information leakage.

Throughout the present description, exemplary embodiments of the invention are described with reference to web surfing, e.g., website navigation on the Internet. However, it will be appreciated that the present invention is not limited to Internet web browsing only. Some embodiments of the present invention can be implemented for securing any kind of data exchange between networks, e.g., using word processing, enterprise applications, mail client (for example in a DMZ or less classified network), and/or safely invoking an external application programming interface (API) from an internal network.

The method and system according to embodiments of the present invention may include a combined hardware and software solution, for example composed of main building blocks, which may include hardware and software components. Various embodiments of the present invention may include the main building blocks of the invention in different configurations, according to customer requirements and/or field conditions.

Some embodiments of the present invention may provide a rapid, reliable and highly secured Internet browsing from within their secured/internal network. Such capability will eliminate the need to establish a designated and separated IT network (consisting of, for example, server farms, virtualization, terminal services, dedicated desktops, switches, routers, dedicated network construction, cabling and deployment), thus, for example, reducing substantial equipment, operational and maintenance costs. In some embodiments, the highly secured solution provided for internet browsing from within the organization closed network, may be equivalent, at least from the security aspect, to setting up a designated, physically separated network for internet browsing.

In some embodiments of the present invention, the risk of data leakage of classified information may be handled and effectively monitored by capturing and logging outgoing information, which then may be presented as a report to the user (based on configurable parameters—time, mouse clicks, keyboard, data length, customer tailored policies, etc.) along with anti-malware methods such as CAPTCHA (Completely Automated Public Turing test to tell Computers and Humans Apart), for an approval as a basis for the continued use of the service.

A solution according to some embodiments of the present invention may be directed towards corporations including many users. Therefore, the solution needs to be efficient in terms of TCO, in the aspects of hardware, maintainability, etc. Known existing solutions may create a full blown operating system environment, per user, which requires a tremendous amount of resources (RAM, CPU and Disk), even in a virtualized system. This may make the known solutions very inefficient in terms of TCO and may require tens of servers per organization/customer. In some embodiments of the present invention, a new concept is introduced, wherein the virtualization includes image rendering process and not virtualization of the entire operating system. Therefore, some embodiments of the present invention can support up to thousands of simultaneous users per one server. Accordingly, in some embodiments of the present invention, a simultaneous use by multiple users of a same instance of a single operating system may be enabled by using browser virtualization capabilities, for example instead of operating system virtualization, with multiple isolated or non-isolated browser instances on given hardware resources. By using browser virtualization capabilities, hardware costs and maintainability may be significantly reduced.

In some embodiments of the present invention, images may be used to transfer content between the different networks. The transferred images may include screenshots of user or machine sessions made by, for example, a virtualized browser, which may consist of an image rendering processor. The images may be made in constant periods of time and/or based on user interaction.

In some embodiments of the present invention, a video channel (e.g., VGA) may be used for transferring information between networks. In order to increase the level of protection, a one-way video transmission channel, one-way analog-to-digital converter and/or one way field-programmable gate array (FPGA) may be provided.

In some embodiments of the present invention, potentially malicious content, for example visual content, (e.g., documents, spreadsheets, pictures, emails) may be transformed to a static safe portable format and transferred between networks in the safe format. The visual data in the safe format may be stored on a local desktop inside the classified network. By using recognition methods such as, for example, Optical Character Recognition (OCR) service, the file in the safe format can be transformed back to its prior format.

In some embodiments of the present invention, user interactivity may be upgraded by routing the browsing experience from one classified network (e.g., via a desktop computer) to, for example, a differently classified network and/or device (e.g., a mobile or tablet device). For example, a user may decide to route a streaming video request for viewing directly on his mobile or tablet device.

It will be appreciated that, throughout the present description, "data exchange" or "browsing" is referenced to the exchange of contents of a web page or a software/program/application window or screen. The contents may include text, images, objects, embedded images and/or objects, scripts, text input fields, file upload fields, buttons and/or any data types suitable to be included in the contents of a web page, a computer program window/screen or an application window/screen. Accordingly, the terms "web server" and/or "web browser" may be used throughout the present description for convenience, although some embodiments of the present invention may also be applied for data exchange between computer networks that may be off the World Wide Web (WWW or "the web"). Therefore, a browser may be any software, application and/or remote server that may enable browsing the internet and/or another network, which may be on or off the web. A "Rendering Processor" in the present description may be a dedicated or a multi-purpose processor, carrying out software that enables interaction with a potential malicious content (e.g. the web, infected documents, etc). Instead of returning the content to the classified and safe corporate network, it may render a screenshot of the content, therefore eliminating all threats and infections.

Reference is now made to FIG. 1, which is a schematic illustration of a system 100 for secured data exchange between computer networks with different security classifications, according to some embodiments of the present invention. The secured browsing/data exchange according to embodiments of the present invention may be based on a regular browser, e.g., there is no need for any designated application and/or program. However, based on customer requirements, a smart client application can be used, for example, to off-load image processing and/or central processing resources to end client machines. System 100 includes a secured browsing server 10, a protection module 16, a rendering processor 12, and a secured transmission module 20. A user of a workstation 50 from a classified/internal network environment 500 may wish to use system 100 for browsing the internet and/or another network environment 600, for example a server 60 in environment 600. It will be appreciated that a workstation may include, for example, a stationary or mobile workstation such as, for example, a stationary computer, a tablet computer a mobile device, a smart-phone, and/or any other suitable device that may be included and/or communicate with classified/internal network environment 500. The transmissions between the different components of system 100 may be encrypted.

Secured browsing server 10 may issue for the user a unique identifier (ID), e.g. an ID uniquely associated with the user, for example identifies the user in an injective manner, e.g., one specific ID for one specific user. The unique ID issued by secured browsing server 10 may be associated for the specific user's session, i.e. the ID is unique for the user and for the specific user session. The unique ID may be, for example, a random number that may be used by system 100 to identify the user during the operation. The issuance of the unique ID may be performed, for example, after authentication of the user to the secured browsing server 10. The authentication may be performed, for example, by user name and password authentication and/or by any known and/or suitable authentication method and/or protocol. For example, the authentication may be performed by Kerberos protocol, any Single-Sign-On (SSO) implementation or any form of multi-factor authentication technique.

Secured browsing server 10 may receive a user input that may be made in a browser page/window, for example displayed on a screen of workstation 50. For example, the user input may be a request/command to fetch a certain webpage, such as web page address, or a command to operate a certain application or program, for example in environment 600, for example via server 60. Secured browsing server 10 may, for example, interpret the user input and/or transform/translate it to a custom internal system command(s). Secured browsing server 10 may send/transmit the commands, for example after translation, to rendering processor 12, for example via protection module 16. In some embodiments of the present invention, transmissions from secured browsing server 10 to rendering processor 12 via protection module 16 may be made, for example, over User Datagram Protocol (UDP)

packets or by any other stateless protocol. In some embodiments of the present invention, such transmissions from secured browsing server 10 to rendering processor 12 via protection module 16 may be made, for example, on a one-way physical transmission channel or secured by a software component that verifies that the traffic flows just in one way. Rendering processor 12 may function as a virtualized browser, for example, by acquiring images and/or information/data from requested pages and rendering images to represent the requested pages.

Protection module 16 may be included in system 100 as a built-in security component. A purpose of protection module 16 may validate the transmissions from secured browsing server 10. The validation by protection module 16 may include decryption and/or validation of the authenticity of the transmission. Additionally, protection module 16 may check the transmissions against a policy and/or schema of messaging protocol such as, for example, a designated serialization messaging protocol according to embodiments of the present invention, which may be stored, for example, for auditing purposes, for example, in secured browsing server 10 and/or in protection module 16. The messaging protocol may be based on serialization of simple objects in the encoding form of XML, JSON, protocol buffers, etc. Upon validation, protection module 16 may construct a message, e.g., a new reflected command, for example a new data packet, based on the translated commands and/or send the message to environment 600 via rendering processor 12. The originally received transmission may be dropped, for example, at this stage. Additionally, protection module 16 may log any outgoing information such as, for example, website addresses the user requested and/or any other data inputs made. Protection module 16 may create a security log listing the logged outgoing data/information, for example in a visual format that may be displayed to a user. Additionally, in some embodiments of the present invention, protection module 16 may ensure that the browsing activity, e.g. the received commands/requests, is made by a human user and not by malware, for example by operating a challenge such as, for example, a CAPTCHA (an acronym for "Completely Automated Public Turing test to tell Computers and Humans Apart") mechanism. For example, if the policy or schema validation failed (e.g., a user tries to input too many keystrokes or tries to browse during non-working hours or other policy or schema is violated), a user challenge may be issued (e.g., CAPTCHA), and/or the user challenge may be issued anyway and/or in other specified cases.

In some exemplary embodiments of the present invention, protection module 16 includes an Intrusion Prevention System (IPS) mechanism that may ensure that only valid messages and transmissions are sent to rendering processor 12, for example by a predefined policy of which form of transmissions, for example which form of UDP (or any other protocol) packets, are valid, wherein invalid packets are omitted. In some embodiments, the IPS mechanism and protection module 16 can be deployed on different operating systems, for example in order to make it difficult for a hostile person or software, who will have to first access the IPS in one operation system, in order to access protection module 16 which runs on another operation system.

In some exemplary embodiments of the present invention, protection module 16 may transform the constructed data packets to analog one-way video transmission. In some exemplary embodiments of the present invention, protection module 16 may include a video output transmission component. The video transmission resulted from the transformed commands may be sent to rendering processor 12 via a video input component which may transform the video back to valid browser command, as will be described in detail herein with reference to some embodiments of the present invention.

Rendering processor 12 may translate the data packet constructed by protection module 16 to an actual web browsing command or request. Rendering processor 12 may then create a new browsing session or use an active session based on the unique ID of the user, for example in case this user has an open active session. Rendering processor 12 may fetch via browser server 60 a requested page and/or window based on the translated request/command. A browsing session of a user may include multiple requests and/or commands, each of them may go through the processes operated by server 10, module 16 and/or processor 12 as described herein, to browse environment 600 for various pages and/or windows in programs/applications. During the browsing session, for example periodically or upon a suitable user command, rendering processor 12 may generate an image, for example, a screenshot, of the user active browsing session performed according to the browsing request. The generated image may include a stamp relating the image to the unique user ID. For example, the unique user ID may be embedded in a portion of the generated image. Rendering processor 12 may send the generated images to secured browsing server 10 via a secured transmission module 20. Based on the unique ID, secured browsing server 10 may maintain a browsing session, for example at a certain state, for a defined period of time and/or based on commands received from the associated user. Secured browsing server 10 may use Application Program Interface (API) features, for example, to allow implementation of image-based browsing, as described in detail herein. For example, secured browsing server 10 may receive from a user commands via various API features, such as, for example, logging in requests, browsing commands, mouse inputs (clicks), keyboard inputs, backward and/or forward commands, for example to obtain a previous or a next page in a browsing history, and/or any other suitable features.

Secured transmission module 20 may transmit the generated images from rendering processor 12 to server 10, for example while ensuring that the generated images are sent securely to the user associated with the unique user ID. Secured transmission module 20 may ensure that the generated images are sent to server 10 exclusively and/or directed to a human user and/or to the correct user associated with the unique ID. Secured transmission module 20 may be configured to transmit the images using a one-way transmission protocol such as UDP (or other protocol). In some embodiments of the present invention, transmission module 20 may include a CAPTCHA mechanism that has to be solved by the user in order to receive the generated image, as will be described in detail herein with reference to some embodiments of the present invention. In some embodiments, transmission module 20 may interface with protection module 16 and/or some components of transmission module 20 may be included in protection module 16 and/or may be placed between protection module 16 and rendering processor 12 as will be described in detail herein with reference to some embodiments of the present invention. In some embodiments, transmission module 20 may include video output and input transmission components to transform the generated images to analog one-way video transmission, as described in detail herein with reference to some embodiments of the present invention.

Secured browsing server 10 may receive the generated images via module 20 and extract from the images the embedded unique user ID, for example by a standard Optical Character Recognition (OCR) mechanism and/or by any other suitable method. For each image, based on the extracted unique ID, server 10 may send the image to the user associated with the extracted unique ID. The user may then be able to view the image, for example at workstation 50.

Figure 2:
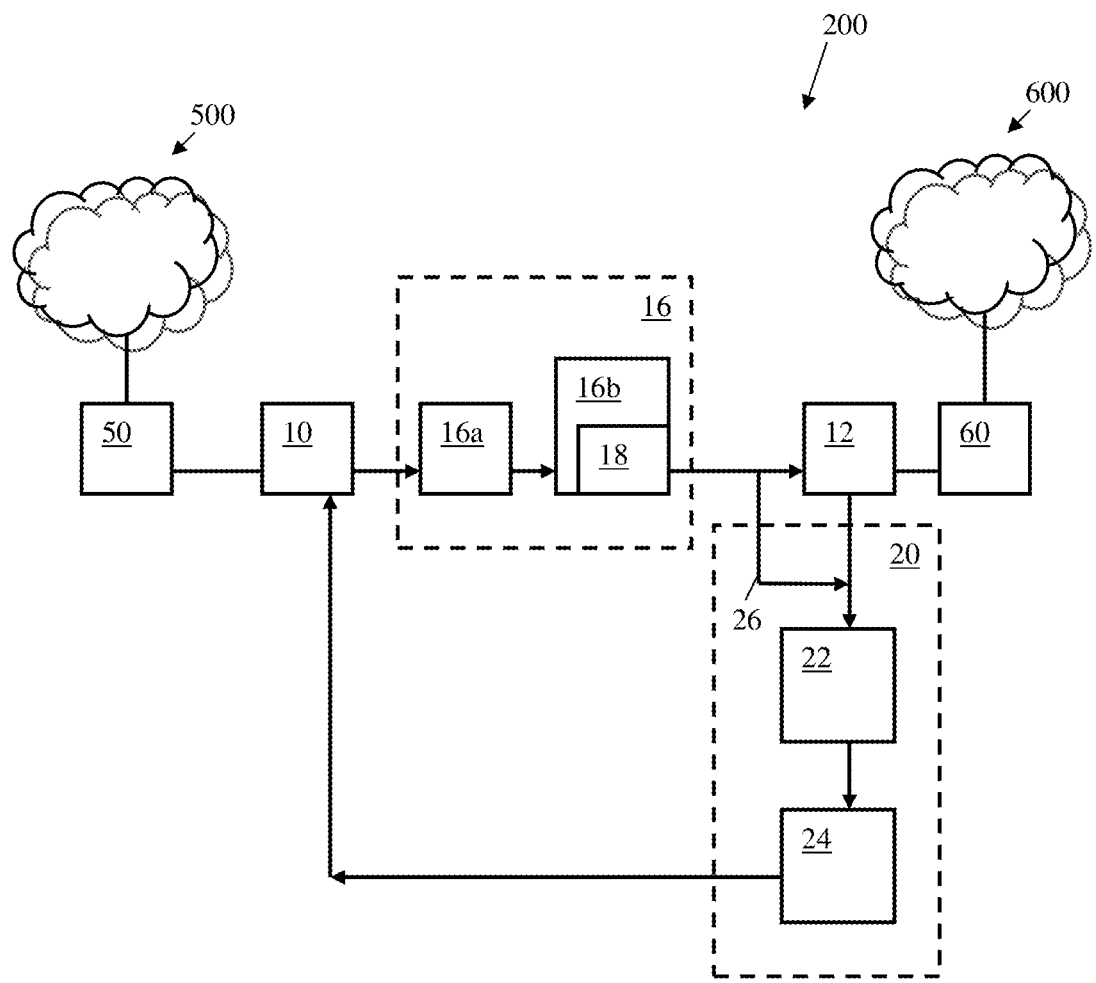
FIG. 2 is a schematic illustration of a system for secured data exchange between computer networks with different security classifications, according to exemplary embodiments of the present invention.

Reference is now made to FIG. 2, which is a schematic illustration of a system 200 for secured data exchange between computer networks with different security classifications, according to exemplary embodiments of the present invention. System 200 may include a secured browsing server 10, a protection module 16, virtualized browser servers 12, and a secured transmission module 20, which are described in detail with reference to FIG. 1. As described, a user of a workstation 50 from a classified environment 500 may wish to use system 200 for browsing the internet and/or a differently classified network environment 600, for example via a browser server 60.

System 200 may act as a proxy server for browsing environment 600, as described in detail herein. Secured browsing server 10 may include a front-end server that may enable, for example, end users to securely browse a network, for example, in environment 600, via system 200 according to some embodiments of the present invention. Secured browsing server 10 may include a single web server or a cluster of servers, for example a server farm, for example managed by a central load balancer. Secured browsing server 10 may be connected to classified environment 500, for example by using a network port such as, for example, an HTTP/HTTPS network port. For example, a 443/HTTPS port, which is an HTTP protocol port over Transport Layer Security/Secure Sockets Layer (TLS/SSL), and/or the 80/HTTP port, which is a Web port.

A connection to server 10 may be initiated from a workstation 50 in environment 500. In some embodiments of the present invention, a user of a workstation 50 may be authenticated in order to use system 200, for example by any known kind and/or form of authentication and/or authorization. The user may use a browser page/user interface such as any known web-browser graphical user interface, or, for example, a window application, to connect and/or log to system 200/server 10. Therefore, for example, a browser and/or window application user-interface such as, for example, a "regular" browser user interface, may be used as a host user interface for secured browsing server 10. Thus, for example, an intuitive and/or regular experience may be provided to the user, by a user interface that may look and feel like regular browsing, for example web browsing. Once the user is logged to sever 10, the connection with server 10 may remain open, e.g. may be used for continuous communication such as, for example, sending commands and inputs and receiving images as described in detail herein.

Once a user is connected/logged to secured browsing server 10, secured browsing server 10 may generate a unique user ID as described herein, for example a random key number. The unique ID may be correlated to a username of the specific user, and it may be used to log into workstation 50, environment 500 and/or the secured browsing server 10. The username may be used during a browsing session by the secured browsing server 10, for example in order to protect the user's identity from appearing in an unsecured network (e.g., the internet) such as environment 600. Secured browsing server 10 may map and/or store in a database mapping between the user's username and the unique ID. The unique ID may be attached to messages from the user that may be sent by the server 10 to rendering processor 12. The unique ID may be coined and/or embedded on an image received by server 10 via secured transmission module 20 as described herein, and/or may be used to correlate the image with the user associated with the unique ID and thus, for example, to send the image to the correct user associated with the unique ID. When receiving an image via secured transmission module 20 as described herein, secured browsing server 10 may extract the embedded unique ID from the image by, for example, OCR or any other suitable standard algorithm and/or method. Based on the extracted unique ID, the image may be sent to the associated user.

When images are received at server 10 from rendering processor 12 as described herein, secured browsing server 10 may convert the images, for example, to an interactive browser, application and/or computer program page. Secured browsing server 10 may convert the images to text, textboxes, images, links, embedded scripts and/or any other suitable page objects of a browser, application and/or computer program, for example by OCR, shape recognition and/or any suitable algorithm and/or method. Secured browsing server 10 may recognize text boxes, links and/or any other objects that may be included in the imaged page, for example the originally requested page, for example by shape recognition, image processing and/or any other suitable method. For example, when rendering processor 12 renders an image from a requested page, text boxes, links, and/or other suitable objects may be marked and/or designed in pre-configured shapes and/or colors. Then, as the rendered image received at server 10, the text boxes, links, and/or other suitable objects may be recognized and/or translated back from image to text boxes, links, and/or other suitable objects, respectively, for example, by shape recognition and/or any other suitable method. The text boxes, links, and/or other suitable objects may be recognized and/or translated back, for example, for presentation to the user in a format similar to the original objects in the requested page format, e.g., presentation as text boxes, links, and/or other suitable formats, respectively.

In some embodiments of the present invention, when a user moves a cursor over parts of the image where text boxes, links, and/or other suitable formats were originally placed, the cursor shape may change in a similar manner in which the cursor may usually change in regular use of a browser, application and/or computer program.

In some embodiments, secured browsing server 10 may convert the images, for example to text, upon receiving a request from a user. For example, a user may mark a certain area in the image, for example, identified by coordinates on the image. The marked portion may be transformed to text, for example by OCR, and presented as text, for example on the corresponding portion of the image.

Secured browsing server 10 may receive input from users such as, for example, browser requests, for example over HTTP/HTTPS protocol. Secured browsing server 10 may receive input from users by, for example, a mouse, keyboard, touch screen, vocal commands and/or by any suitable input device or method. Secured browsing server 10 may interpret browser requests received from a user and/or translate the requests to UDP (or other protocol) messages according to the messaging protocol of system 200. The system protocol messages, for example based on UDP packets, may then be outputted from server 10 to protection module 16.

Protection module 16 may include an intrusion prevention system 16a and a security module 16b. Security module 16b may perform the functions described above with reference to protection module 16. Intrusion prevention system 16a may be configured to ensure that transmissions sent to rendering processor 12 are valid according to a predefined policy. Intrusion prevention system 16a may be placed in-line with security module 16b, for example in a transparent mode, enabling no bypassing of intrusion prevention system 16a. In some embodiments, intrusion prevention system 16a may be configured to a fail-safe mode, so that, for example, no failures may be allowed. In some embodiments, intrusion prevention system 16a may be configured in bridge mode.

Intrusion prevention system 16a may receive as input UDP (or other protocol) messages, forwarded by server 10, and may validate that the messages match the protocol of system 200. For example, intrusion prevention system 16a may protect security module 16b, for example by making sure that only valid UDP (or other protocol) messages are sent to security module 16b. Intrusion prevention system 16a may output only valid UDP (or other protocol) messages. Thus, for example, intrusion prevention system 16a may omit at least some sorts of network attacks on security module 16b. Intrusion prevention system 16a may be based on Suricata® and/or any other suitable intrusion prevention software product, and/or may be especially customized and/or implemented software and/or hardware in system 200. In some embodiments, intrusion prevention system 16a may store and/or have access to a predefined list (such as a "white list") of types of messages that are valid within the protocol of system 200, and/or for each valid message type, the valid range of inputs. Invalid packets/messages may be dropped and/or not be forwarded to security module 16b. The connection between intrusion prevention system 16a and security module 16b may be a one-way connection, facilitated, for example, by a one-way physical cable.

Security module 16b may receive the UDP (or other protocol) messages via intrusion prevention system 16a. Security module 16b may validate the messages according to a protocol of system 200, e.g., may make sure that only valid messages are sent to virtualized browser 12. Security module 16b may track user activity via a browser user interface, for example, requested pages and/or user inputs and/or any other activity of the user that may go through security module 16b and/or system 200. Security module 16b may store the tracked user activity and/or data representing and/or describing the tracked user activity in a local database 18. Security module 16b may balance the load on virtualized browser 12 by allocating for a user requesting a connection to rendering processor 12 a suitable and/or available Internet Protocol (IP) address of a server operating rendering processor 12, which may be, for example, one of a plurality of servers such as a server farm, for example, dedicated for rendering processor 12. Security module 16b may forward the UDP messages received via intrusion prevention system 16a to an IP address of the designated server operating rendering processor 12, for example by changing a destination address of a message to the IP address of the designated server. Security module 16b may make sure a human and/or legitimate user is using system 200, for example by deploying a CAPTCHA mechanism, which may be managed and/or controlled by and/or with the cooperation of security module 16b.

Security module 16b may receive data by a one way physical link and send data by a one way physical link, for example, to ensure that the flow of the data from intrusion prevention system 16a to rendering processor 12 via security module 16b is an exclusive unidirectional flow of data. Security module 16b may interpret the received transmission as a message and/or validate the message against a messaging protocol of system 200. If valid, security module 16b may send the message to rendering processor 12. A transmission received by security module 16b from server 10 may include the unique ID associated with the user sending the transmission, e.g., a request to fetch a page. Security module 16b may determine, for example based on the unique ID, whether the user is a new user, e.g., if the unique ID is not already stored in the local database 18. For a new user, security module 16b may create a new record in the local database 18. Then, security module 16b may allocate a suitable/available IP address of server operating rendering processor 12, and/or may initiate a browsing session by using this IP address. For an existing user, e.g., if the unique ID is already stored in database 18, security module 16b may create a message based on the transmission received from the user, for example including the contents of a request entered by the user, wherein the destination IP may be, for example, of a server previously allocated for this user. Security module 16b may receive user inputs such as, for example, text entered to a text box, page requests and/or any other suitable request and/or may track and/or store the requests in local database 18. The tracked data may be a source for generating a security log.

Security module 16b generates a security log that may be used, for example, to ensure that transmissions and/or browsing activity are made by a human and/or legitimate user and not, for example, by malware. Therefore, security module 16b may generate a security log, for example, in an image format, including the inputs a user entered through system 200. If a user identifies a lack of correlation between the generated log and the actual inputs he entered, he may report to server 10. The security log may be generated by security module 16b, for example, every given period of time. Additionally, security module 16b may create a CAPTCHA mechanism that may be presented to a user, for example, periodically and/or upon sending a request and/or before receiving an image. In case a user has not solved the CAPTCHA, e.g., not entered the CAPTCHA data correctly, the session is terminated and/or the requested page is not presented to him. The correct CAPTCHA solution/data may be stored in database 18. The created CAPTCHA may be embedded in the security log image, for example at a random location on the image. Before generating a CAPTCHA, protection module 16 may validate and/or approve the user and/or the user's behavior based on a policy (according to, for example, entered keywords, white/black labels, keystrokes, mouse clicks, session length, session hours and/or any other custom-based and/or another kind of policy).

Secured transmission module 20 may include a video output transmission component 22 and a video input transmission component 24. Rendering processor 12 may send the generated images to video output component 22 by a one-way protocol. Secured transmission module 20 may be configured to transmit the generated image from rendering processor 12 via video output component 22, for example, by a one-way transmission port. Video output component 22 may be configured to send the image to video input component 24 via an analog port. Video input component 24 may re-generate the image received from the analog port in a suitable image format and/or may send the regenerated image to secured browsing server 10, for example over a one way protocol such as, for example, TCP or UDP, for example over a one-way link connection. Video input component 24 may be or include, for example, a standard hardware component using a commercially available frame grabber, for example with high frame rate capture speed and/or high resolution.

Additionally, secured transmission module 20 may include a by-pass transmission module 26 to pass data packets and/or objects that may be sent from security module 16b to video output component 22 such as, for example, security logs that may enhance verification of the user receiving the image. For example, security module 16b may generate a CAPTCHA mechanism, embed the CAPTCHA in an image format security log and send the image format security log to the video output component 22 via the By-Pass transmission module 26. The video output component 22 may then transmit the image format security log to the secured browsing server 10, via the video input component 24 and/or in the same manner as described herein with reference to transmission of generated images. Before receiving an image from the secured browsing server 10, a user may be requested to input the CAPTCHA data correctly.

The CAPTCHA mechanism may be used to ensure that the outgoing data and all browsing activity are made by a user authorized to use the system, and, for example, not by malware exploiting the system. A malware may, for example, generate a data leakage channel, by sending commands imitating valid human use, for example in a covert channel. As mentioned above, security module 16b may generate a security report, for example a log of the browsing activity, as an image. Additionally, security module 16b may generate a CAPTCHA mechanism and embed the CAPTCHA in the security log image, for example in a random location on the security log image. The CAPTCHA input data may be recorded by security module 16b in local database 18. Security module 16b may send the security log image to video output component 22, for example via a physical one-way link. Video output component 22 may transmit the image to video input component 24 as a regular image, e.g., an analog image. Secured browsing server 10 may receive the security log image and may prompt it to the relevant user, for example according to the unique ID. A CAPTCHA answer may be received form the user and may be validated, for example, by security module 16b against a relevant CAPTCHA record in database 18. In case the answer is incorrect, or in case an answer is not received, the user session may be terminated or, in some embodiments, another CAPTCHA may be provided to the user.

Figure 3:
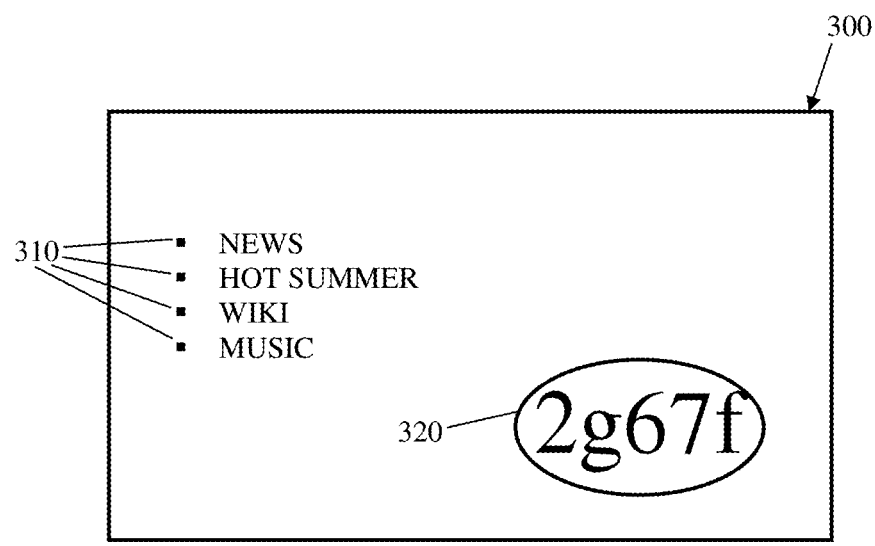
FIG. 3 is a schematic illustration of a security log image according to embodiments of the present invention.

FIG. 3 is a schematic illustration of a security log image 300 according to some embodiments of the present invention. Security log image 300 may include, for example, a plurality of user inputs 320 recorded by security module 16b, as described in detail herein. Additionally, Security log image 300 may include a CAPTCHA string 320, which has to be input by a user, as described in detail herein.

Returning to FIG. 2, rendering processor 12 may function as a browser client, e.g., browsing requests generated originally at workstation 50 may be executed at rendering processor 12 instead of at workstation 50. Rendering processor 12 may include a plurality, for example, a cluster, of servers enabling numerous users at numerous corresponding workstations to access, fetch, reach, operate, view and/or communicate with various pages, sites, applications and/or programs in environment 600. Thus, for example, a certain machine in environment 600, such as a server or workstation 60 in environment 600, may be accessed, operated, viewed and/or communicated with by numerous users at numerous corresponding workstations at the same time, via rendering processor 12. A machine in environment 600 may, for example, have numerous instances as numerous corresponding browsing sessions by multiple users at the same time, via rendering processor 12. Rendering processor 12 may be vulnerable, for example due to the fact it is connected to the external environment 600. Rendering processor 12 may include and/or may have installed thereon a configurable rebuild mechanism to rebuild a server of rendering processor 12 that was attacked by a malware. The configurable rebuild mechanism may enable rebuilding of the server of rendering processor 12 such that, for example, the attacking malware is vanished.

Security module 16b may store and/or have access to a list of rendering processors 12 and their corresponding IP addresses. Security module 16b may send user requests as messages, for example as UDP packets, to one of rendering processors 12, for example by a one-way physical transmission medium.

Rendering processor 12 may convert a received message to an actual action such as, for example, a HTTP/S request, a mouse click and/or any other suitable user input. Rendering processor 12 may receive valid user messages from security module 16b and send requests to environment 600 and/or server 60 in environment 600 according to the received messages, such as user requests to view, operate and/or use a website, application and/or program page.

Rendering processor 12 may capture screenshots of an active browser sessions, e.g., render a screenshot image of a current page in an active browser session, e.g., a page activated based on the user's request, and send the screenshot image to video output component 22. The image rendering may be a low-privilege process and/or may be performed with no access to the underlying operating system. Rendering processor 12 may capture contents from a page of a website, application and/or program, may render an image of the captured contents, and/or may send the contents in static image format to the user via secured transmission module 20 and server 10. Rendering processor 12 may generate the image based on a time interval, e.g. periodically, and/or based of a user interaction and/or based on image differentiation detection. The image generated by rendering processor 12 may include a screenshot of an active session, e.g. a page activated based on the user's request, for example with the user unique ID embedded within the image as described in detail herein. Rendering processor 12 may transmit the image to video output component 22, for example via a one-way physical transmission medium.

Server 10 may deliver the contents to the user, for example after reconstruction and/or processing, for example as image file, PDF file, or any other suitable file format that may be presented by workstation 50 and/or enable interactive browsing experience, as described in detail herein. The captured image and/or the reconstructed page may be sent to workstation 50 and/or another device of the user as a file that may be saved and/or stored at workstation 50 and/or the another user device. In some embodiments of the present invention, rendering processor 12 may transform contents of a page to a static visual image file, for example, to a PDF file, including the unique ID embedded in the visual image. Further, the file may include a sequential number of the page, for example embedded in the image. Rendering processor 12 may send the visual image file to video output component 22. When received by server 10, server 10 may assemble several received visual image files into a processed visual file that may be viewed, operated, used and/or saved by a user.

Rendering processor 12 may enable anonymous web browsing, for example by defining and/or having rendering processors 12 define network ports that may anonymize the network access, such as, for example, a 443/HTTPS port and/or 80/HTTP port. Via rendering processor 12, users may browse environment 600 anonymously, wherein rendering processor 12 browses environment 600 on behalf of the users of environment 500. Each one of the servers of rendering processor 12 may be configured to tunnel HTTP/S requests anonymously. In some embodiments of the present invention, rendering processor 12 may be based on Google's CHROMIUM™ capabilities that enable browser virtualization. For example, a chrome instance may be generated and API commands may be used, for example to enable creation of many sub-instances of a browser and/or to enable programming interaction with the created instances. Rendering processor 12 may browse environment 600, for example via browsing server 60, which may serve as a proxy server for browsing environment 600, thus, for example, the browsing may be anonymized.

Video output component 22 may receive images, for example in UDP packets, from any of rendering processors 12 and/or from security module 16b, via a one-way physical transmission medium and/or protocol. Video output component 22 may transform the images to video format and/or transmit the images in video format, e.g., a video signal, via a one-way transmission connection and/or protocol, to video input component 24. Video input component 24 and/or the one-way connection may include a one-way video channel and/or other one-way transmission mediums, for example which may constitute and/or carry out an image scan protocol, e.g. a protocol that separates hermetically a less secured environment from a more secured environment, for example by regeneration of transmissions and/or information in any format received from environment 600 via rendering processor 12 as images before transmission of the images to server 10 and/or reconstruction of the images before transmission of the images to the user at workstation 50, thus disconnecting and/or disabling any link and/or association to environment 600 and/or to transmissions and/or information received from environment 600, and/or disabling any possibility of leakage of data into environment 600.

Before transmission, video output component 22 may ensure that the connection with video input component 24 includes a video channel configured for exclusive one-way transmission. Video output component 22 may transmit to video input component 24 via multiple one-way channels, mediums and/or ports, for example in order to enable high transmission volume. Video output component 22 may include video ports to transmit video to video input component 24, the video ports may be or include analog video ports and/or digital ports along with Digital To Analog/Analog To Digital (DTA/ATD) converters. Video output component 22 may include an exclusive video output cable (for example, VGA/DVI output cable) and/or an exclusive one-way video appliance (for example, VGA/DVI one-way video appliance). Thus, for example, video output component 22 may assure physical unidirectional video transmission. An exclusive video output cable that may be included in video output component 22 may include, for example, an analog cable configured to transmit video only, for example with disabled Extended Display Identification Data (EDID) and/or other transmission abilities. An exclusive one-way video appliance may include video input and output, for example VGA input and output and/or may include, for example, an isolation feature that may completely isolate the video source from the display, for example based on an analog video diode that blocks any returned signals. The isolation feature may also block some non-video transmissions and/or may include anti-tampering appliance.

Video input component 24 may operate as frame grabber, e.g. may receive analog video input and/or regenerate images from the received video, for example capture images from the received video. Video input component 24 may include a frame grabber and/or may capture high frame rate images. Video input component 24 may output the images captured from the video and/or may send the images to secured browsing server 10, for example via a one-way connection such as, for example, a UDP one-way connection. Secured browsing server 10 may process the images, for example by OCR and/or other method as described in detail herein, extract the unique ID embedded in the image and/or send the image to the associated user, as discussed in detail herein.

It will be appreciated that, according to some embodiments of the present invention, a system for secured data exchange between computer networks with different security classifications may include other configurations that may constitute and/or carry out an image scan protocol to separate hermetically a less secured environment from a more secured environment, as described herein. The image scan protocol may be included in various configurations of, for example, protection module 16, security module 16b, secured transmission module 20, video input component 24 and/or any of the one-way connection ports. In some embodiments, for example, secured transmission module 20 and/or protection module 16 may transmit to secured browsing server 10, over a one-way link, an RGB matrix of integers representing the image rendered by rendering processor 12. Secured transmission module 20 and/or protection module 16 may disassemble and re-assemble the rendered image, for example by using picture filters, and may transmit the re-assembled image to secured browsing server 10.

In some exemplary embodiments of the present invention, secured transmission module 20 may convert a file received from environment 600 such as, for example, a file including a series of slides such as, for example, a Powerpoint® file, to a static format such as, for example, image or PDF file, or the file may be processed by a data scrubbing component which may remove potentially malicious content from the file, or the file may be executed, and the static format and/or executed file may be displayed as video. The video may be converted to images, for example by processing the file metadata, and/or may be converted to a static diagram/schema image. The information included in the file received from environment 600 may then be reconstructed, for example by image processing/recognition methods, for example at server 10.

In some embodiments of the present invention, an administrator may review a data exchange log of the data exchange between a user in environment 500 and environment 600. For example, server 10 may store a data exchange log which may audit, for example, all images going in and out of the network, to enable tracking and detecting of inappropriate, harmful and/or forbidden activities. Some embodiments of the present invention may enable auditing of the exact user experience, by auditing images of viewed, used and/or operated pages rather than having a mere list of, for example, HTTP/S addresses. Some embodiments of the present invention may enable recording and/or playing back of a video of the browsing experience, made of the series of images viewed, used and/or operated by a user.

Figure 4:
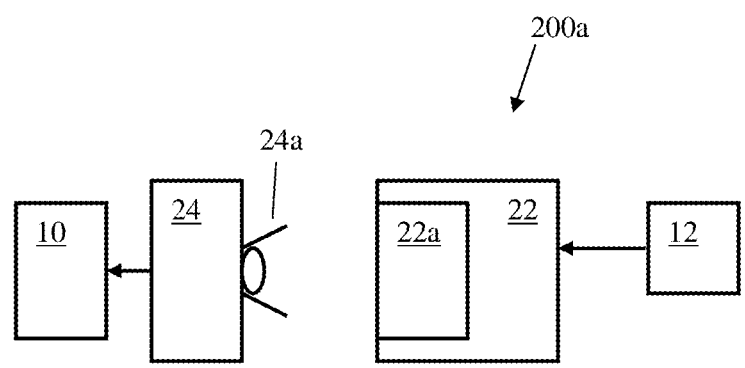
FIG. 4 is a partial schematic illustration of an exemplary system of another configuration for secured data exchange between computer networks with different security classifications, according to embodiments of the present invention.

Reference is now made to FIG. 4, which is a partial schematic illustration of an exemplary system 200a of another configuration for secured data exchange between computer networks with different security classifications, according to some embodiments of the present invention. In system 200a, video output component 22 may include a display monitor 22a that may display, for example the images rendered by rendering processor 12, for example in video format. Video input component 24 may include a camera 24a, which may be, for example, a fast frame rate camera and/or high definition camera that may capture, for example continuously, frames presented on display monitor 22a. Video input component 24 may transmit the images captured from the displayed video to secured browsing server 10, for example via a one-way connection such as, for example, a UDP one-way connection. Secured browsing server 10 may process the images, for example by OCR and/or other method as described in detail herein, extract the unique ID embedded in the image and/or send the image to the associated user, as discussed in detail herein.

While FIGS. 1 and 2 illustrate basic embodiments of the present invention and the basic building blocks of a system 100 and/or 200 according to some embodiments of the present invention, it will be appreciated that some embodiments of the present invention may include other configurations of systems for secured data exchange between computer networks with different security classifications, for example including the basic building blocks presented in FIGS. 1 and/or 2.

Figure 5:
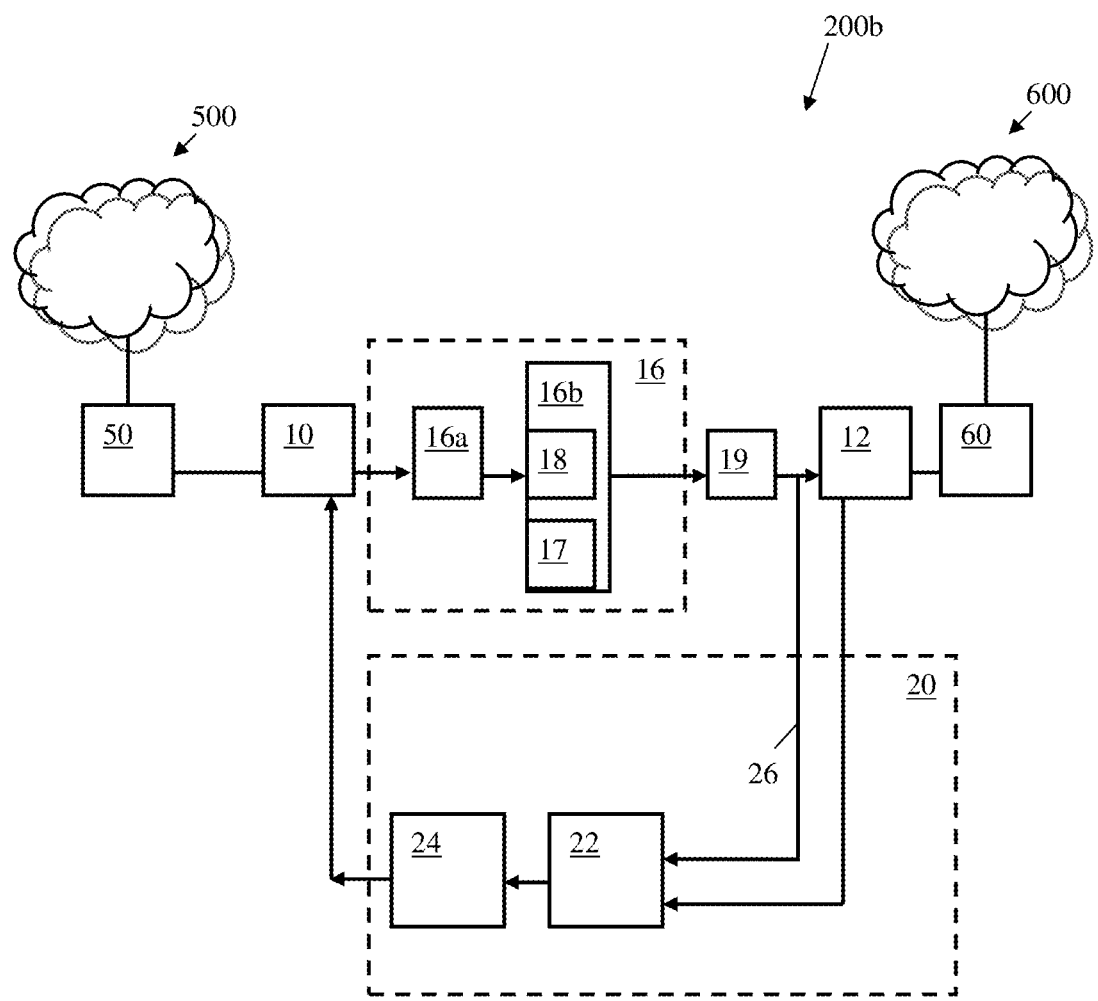
FIG. 5 is a schematic illustration of an exemplary system for secured data exchange between computer networks with different security classifications, according to embodiments of the present invention.

Reference is now made to FIG. 5, which is a schematic illustration of an exemplary system 200b for secured data exchange between computer networks with different security classifications, according to embodiments of the present invention. System 200b may include a secured browsing server 10, a protection module 16 including an intrusion prevention system 16a and a security module 16b, rendering processor 12, and a secured transmission module 20, which are described in detail with reference to FIG. 2 and/or may operate and/or function in a similar manner as described with reference to FIGS. 1 and 2. As described, a user of a workstation 50 from a classified environment 500 may wish to browse via system 200b the internet and/or another network in a less classified environment 600, for example by a browsing server 60 in environment 600.

Additionally, protection module 16 may include, for example in security module 16b, an internal video output transmission component 17, for example to transform constructed data packets to analog one-way video transmission. System 200b may further include an internal video input component 19, for example configured to transform the video received from component 17 to valid browser command, and to send the valid commands to rendering processor 12. Secured transmission module 20 may include video output transmission component 22 and video input transmission component 24 as described in detail above, which are external to protection module 16. Therefore, it will be appreciated that components 22 and 24 are also called external video output transmission component 22 and external video input transmission component 24 throughout the present description.

According to some embodiments of the present invention, protection module 16 may be configured to generate a CAPTCHA mechanism and/or send the CAPTCHA via internal video input transmission component 19 to external video output component 22 by one-way transmission. External video output component 22 may be configured to send the CAPTCHA to external video input component 24, for example via an analog port. External video input component 24 may be configured to re-generate the CAPTCHA received via the analog port and/or to send the regenerated CAPTCHA to secured browsing server 10.

According to some embodiments of the present invention, protection module 16 may be configured to create a security log in image format and a CAPTCHA embedded in the image format security log, and to send the security log to secured browsing server 10 as described in detail herein.

As described, a user may login to secured browsing server 10 and/or to system 200b by, for example, a known authorization method. Secured browsing server 10 may initiate a browsing session for the authorized user and/or generate a user unique ID exclusively associated with the user. Secured browsing server 10 may interpret the user's browsing requests to user messages in a format suitable for processing by system 200b, for example as UDP packets. The interpreted user messages may be sent to internal video output transmission component 17, for example, via intrusion prevention system 16a discussed in detail above to ensure the messages are valid. Security module 16b and/or internal video output transmission component 17 may convert the user messages to image and/or send the image as video data, for example VGA data, to internal video input transmission component 19. The video data may be sent to internal video input transmission component 19 by a one-way transmission medium and/or by analog video port and/or transmission method, and may include, for example, video data exclusively. Internal video input transmission component 19 may use image processing/recognition method such as, for example, OCR or another suitable method, to convert the image to a valid browsing user message, such as a request or command, according to the messaging protocol of system 200b. The valid browsing message may then be transmitted to rendering processor 12. Additionally, the valid browsing message may be stored in database 18 and/or may be used for generation of a security log as described herein.

As described herein, security module 16b may generate a security log including a list of messages received from the user, in an image format. The security log may be transmitted via internal video input transmission component 19 to external video output component 22, for example, without conversion of the image, and/or, for example, via one-way by-pass transmission module 26 and/or by a one-way transmission medium and/or protocol.

As described in detail above, a CAPTCHA mechanism may be generated by security module 16b and may be embedded in the image format security log. In some embodiments of the present invention, the CAPTCHA mechanism and/or the CAPTCHA solution/input data may be transmitted to secured transmission module 20 through rendering processor 12, for example as a separate image and/or embedded within the rendered page image. The CAPTCHA solution/input data may be stored at server 10 and/or at database 18. When received by secured browsing server 10, the user may be requested to solve the CAPTCHA, e.g., to input a solution into the CAPTCHA mechanism which was embedded as an image in the security log and/or sent to the user as separate image.

Figure 6:
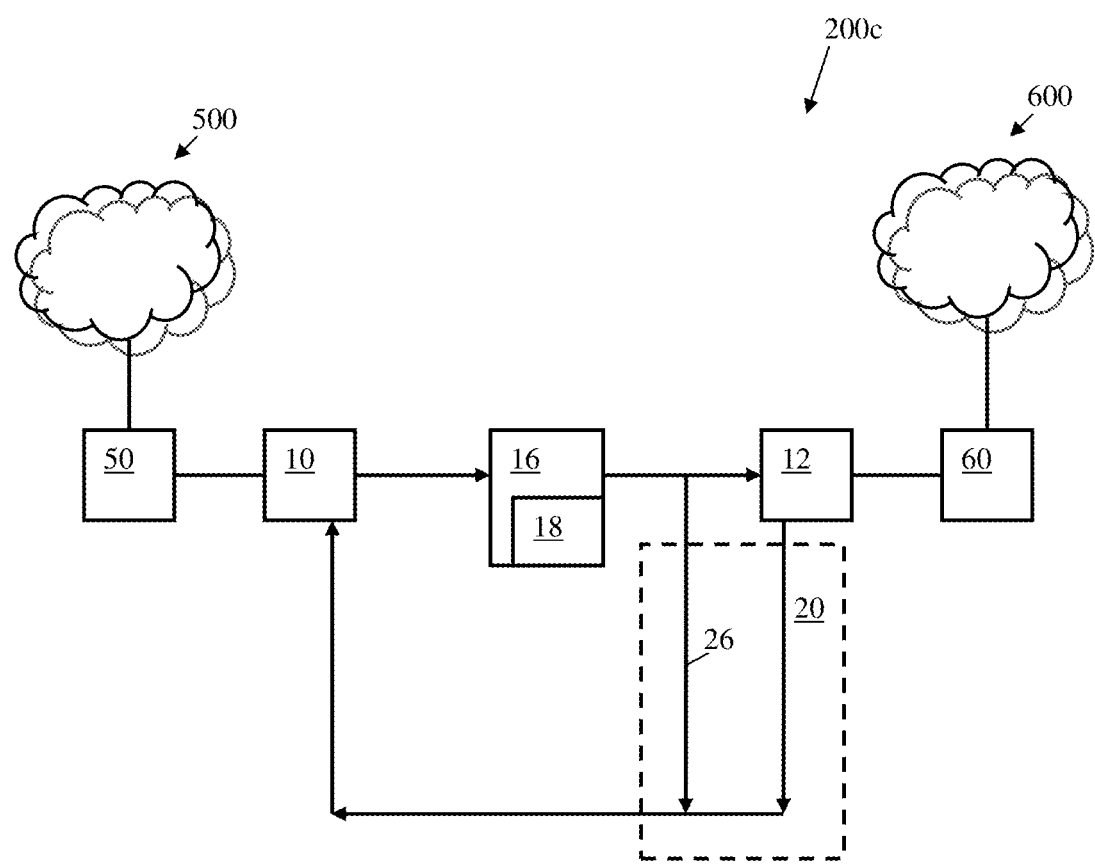
FIG. 6 is a schematic illustration of an exemplary system for secured data exchange between computer networks with different security classifications, according to embodiments of the present invention.

Reference is now made to FIG. 6, which is a schematic illustration of an exemplary system 200c for secured data exchange between computer networks with different security classifications, according to some embodiments of the present invention. System 200c may include a secured browsing server 10, a protection module 16 that may include an intrusion prevention system 16a and a security module 16b (not shown in FIG. 6), rendering processor 12, and a secured transmission module 20 including a one-way by-pass transmission module 26, which are described in detail with reference to FIG. 2 and/or may operate and/or function in a similar manner as described with reference to FIGS. 1 and 2. As described, a user of a workstation 50 from a classified environment 500 may wish to browse via system 200c the internet and/or another network in a differently classified environment 600, for example by a browser server 60 in environment 600.

As described, a user may login to secured browsing server 10 and/or to system 200a by, for example, a known authorization method. Secured browsing server 10 may initiate a browsing session for the authorized user and/or generate a user unique ID exclusively associated with the user. Secured browsing server 10 may interpret the user's browsing requests to user messages in a format suitable for processing by system 200c, for example as UDP packets. Protection module 16 may ensure that the messages are valid browsing user messages, such as a request or command, according to the messaging protocol of system 200c. The valid browsing message may then be transmitted to rendering processor 12.

Additionally, the valid browsing message may be stored in database 18 and/or may be used for generation of a security log as described herein.

Rendering processor 12 may render page images of pages requested by a user, as described in detail herein. The rendered images may include the user unique ID as described in detail herein. Rendering processor 12 may send the rendered image to secured browsing server 10 via one-way secured transmission module 20, which may transmit in some embodiments, for example, over TCP or UDP one way protocol.

As described herein, protection module 16 may generate a security log including a list of messages received from the user, in an image format. The security log may be transmitted, for example, via one-way by-pass transmission module 26 and/or by a one-way transmission medium and/or protocol to secured browsing server 10.

As described in detail above, protection module 16 may generate a CAPTCHA and/or may be embed the CAPTCHA in the image format security log. In some embodiments of the present invention, the CAPTCHA mechanism and the CAPTCHA input data/solution may be transmitted to server 10 via secured transmission module 20 through rendering processor 12, for example as a separate image and/or embedded within the rendered page image. The CAPTCHA input data/solution may be stored in server 10 and/or in local database 18. When received by secured browsing server 10, the user may be requested to solve the CAPTCHA, e.g., input a solution into the CAPTCHA mechanism which was embedded in the security log and/or sent to the user as separate image.

Figure 7:
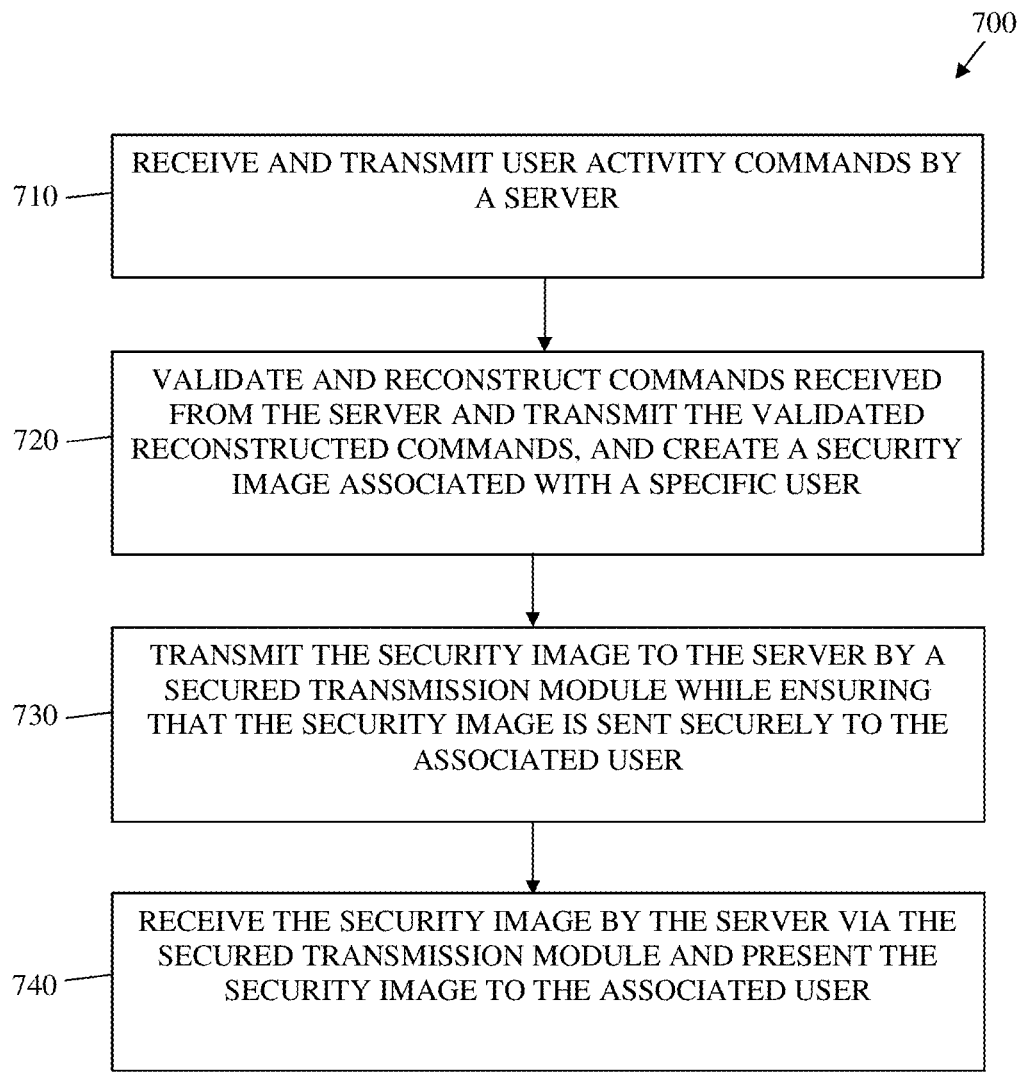
FIG. 7 is a flowchart illustrating a method for prevention of data leakage according to embodiments of the present invention.

Reference is now made to FIG. 7, which is a flowchart illustrating a method 700 for prevention of data leakage according to some embodiments of the present invention. As indicated in block 710, the method may include receiving and transmitting user activity commands by a server, for example as described in detail herein. As indicated in block 720, the method may include validating and reconstructing commands received from the server and transmitting the validated reconstructed commands, and creating a security image associated with a specific user by a protection module, for example as described in detail herein. As indicated in block 730, the method may include transmitting the security image to the server by a secured transmission module while ensuring that the security image is sent securely to the associated user, for example as described in detail herein. As indicated in block 740, the method may include receiving the security image by the server via the secured transmission module and presenting the security image to the associated user, for example as described in detail herein.

As described in detail herein, according to some embodiments of the present invention, the security image includes a CAPTCHA challenge that has to be solved by the associated user in order to receive further data via the secured transmission module.

As described in detail herein, according to some embodiments of the present invention, the protection module includes a database to store outgoing commands and wherein the security image includes a security log in a visual format listing the outgoing commands entered by the associated user.

As described in detail herein, according to some embodiments of the present invention, the activity commands includes at least one of a list including text entered to a text box, web-page requests and/or any other suitable request.

As described in detail herein, according to some embodiments of the present invention, the activity commands are received via a browser user interface.

As described in detail herein, according to some embodiments of the present invention, the method may further include validating commands by the protection module based on a pre-determined policy of user behavior.

As described in detail herein, according to some embodiments of the present invention, the method may further include generating a CAPTCHA challenge and including the CAPTCHA challenge in the created security image in case the pre-determined policy is violated by the user, the CAPTCHA challenge has to be solved by the associated user in order to receive further data via the secured transmission module.

As described in detail herein, according to some embodiments of the present invention, the secured transmission module includes a one-way by-pass transmission module, wherein the method includes sending the security image created by the protection module to the server separately from data received from another machine.

As described in detail herein, according to some embodiments of the present invention, the method may further include creating the security image every given period of time, periodically and/or upon sending a request and/or before transmission of data from another machine via the secured transmission module.

As described in detail herein, according to some embodiments of the present invention, the secured transmission module includes a video output and input components, and wherein the method further includes receiving by the video output component the security image by one-way transmission and sending the security image to the video input component by an analog port, and regenerating the security image and sending the regenerated security image to the server by the input video component.

As described in detail herein, according to some embodiments of the present invention, the method may further include receiving data by the server via the secured transmission module, displaying the data as an interactive page enabling a user to operate the interactive page and sending data of the operated pages as activity commands via the protection module.

As described in detail herein, according to some embodiments of the present invention, the method may further include storing by the server a data exchange log of audit images of received and/or sent data and/or creating a video made of the audit images.

As described in detail herein, according to some embodiments of the present invention, the security image further includes at least one of the audit images or a video made of the audit images.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for prevention of data leakage, the system comprising:
   a first server configured to receive and transmit user activity commands to a protection module;
   the protection module configured to validate and reconstruct the commands received from the first server and to transmit the validated reconstructed commands to a second server for accessing a requested resource by a specific user via a secured transmission module, the protection module further configured to create a security image associated with the specific user and the user activity command; and the secured transmission module configured to transmit the security image to the first server while ensuring that the security image is sent securely by the secured transmission module to the associated specific user, wherein the first server is further configured to receive the security image via the secured transmission module and to present the security image to the associated specific user so as to enable the user to operate an interactive page with the first server via the protection module to send the user activity commands to the second server.

2. The system of claim 1, wherein the security image comprises a CAPTCHA challenge that has to be solved by the associated specific user in order to receive further data via the secured transmission module.

3. The system of claim 1, wherein the protection module comprises a database to store outgoing commands and wherein the security image comprises a security log in a visual format listing the outgoing commands entered by the associated specific user.

4. The system of claim 3, wherein the activity commands comprises at least one of a list comprising text entered to a text box, web-page requests and/or any other suitable request.

5. The system of claim 3, wherein the activity commands are received via a browser user interface.

6. The system of claim 1, wherein the protection module is configured to validate commands based on a pre-determined policy of user behavior.

7. The system of claim 6, wherein a CAPTCHA challenge is generated and included in the created security image in case the pre-determined policy is violated by the user, the CAPTCHA challenge has to be solved by the associated specific user in order to receive further data via the secured transmission module.

8. The system of claim 1, wherein the secured transmission module comprises a one-way by-pass transmission module for sending the security image created by the protection module to the first server separately from data received from the second server.

9. The system of claim 1, wherein the protection module is configured to create the security image every given period of time, periodically and/or upon sending a request and/or before transmission of data from the second server via the secured transmission module.

10. The system of claim 1, wherein the secured transmission module comprises a video output and input components, and wherein the video output component is configured to receive the security image by one-way transmission and send the security image to the video input component by an analog port, and wherein the video input component is configured to regenerate the security image and send the regenerated security image to the first server.

11. The system of claim 1, wherein the first server is configured to receive data via the secured transmission module, display the data as an interactive page enabling a user to operate the interactive page and send data of the operated pages as activity commands via the protection module.

12. The system of claim 11, wherein the first server is configured to store a data exchange log of audit images of received and/or sent data and/or create a video of the browsing experience made of said audit images.

13. The system of claim 12, wherein the security image further comprises at least one of said audit images or a video made of said audit images.

14. A method for prevention of data leakage, the method comprising:

receiving, by a hardware processor of a first server, and transmitting user activity commands to a protection module;

validating and reconstructing by the protection module the commands received from the first server and transmitting the validated reconstructed commands to a second server for accessing a requested resource by a specific user via a secured transmission module, and creating by the protection module a security image associated with the specific user and the user activity command; and transmitting the security image to the first server by a secured transmission module while ensuring that the security image is sent securely by the secured transmission module to the associated specific user; and receiving the security image by the first server via the secured transmission module and presenting the security image to the associated specific user so as to enable the user to operate an interactive page with the first server via the protection module to send the user activity commands to the second server.

15. The method of claim 14, wherein the security image comprises a CAPTCHA challenge that has to be solved by the associated specific user in order to receive further data via the secured transmission module.

16. The method of claim 14, wherein the protection module comprises a database to store outgoing commands and wherein the security image comprises a security log in a visual format listing the outgoing commands entered by the associated specific user.

17. The method of claim 16, wherein the activity commands comprises at least one of a list comprising text entered to a text box, web-page requests and/or any other suitable request.

18. The method of claim 16, wherein the activity commands are received via a browser user interface.

19. The method of claim 14, further comprising validating commands by the protection module based on a pre-determined policy of user behavior.

20. The method of claim 19, further comprising generating a CAPTCHA challenge and including the CAPTCHA challenge in the created security image in case the pre-determined policy is violated by the user, the CAPTCHA challenge has to be solved by the associated specific user in order to receive further data via the secured transmission module.

21. The method of claim 14, wherein the secured transmission module comprises a one-way by-pass transmission module, wherein the method comprises sending the security image created by the protection module to the first server separately from data received from the second server.

22. The method of claim 14, further comprising creating the security image every given period of time, periodically and/or upon sending a request and/or before transmission of data from the second server via the secured transmission module.

23. The method of claim 14, wherein the secured transmission module comprises a video output and input components, and wherein the method further comprises receiving by the video output component the security image by one-way transmission and sending the security image to the video input component by an analog port, and regenerating the security image and sending the regenerated security image to the first server by the input video component.

24. The method of claim 14, further comprising receiving data by the first server via the secured transmission module, displaying the data as an interactive page enabling a user to operate the interactive page and sending data of the operated pages as activity commands via the protection module.

25. The method of claim 24, further comprising storing by the first server a data exchange log of audit images of received and/or sent data and/or creating a video made of said audit images.

26. The method of claim 25, wherein the security image further comprises at least one of said audit images or a video made of said audit images.

* * * * *